June 28, 1960   R. H. RILEY, JR., ET AL   2,942,490
TWO-SPEED TRANSMISSION FOR PORTABLE POWER-OPERATED TOOL
Filed Sept. 17, 1959   5 Sheets-Sheet 1

INVENTORS
ROBERT H. RILEY, JR.
HAROLD O. SHORT
BY
*Leonard Bloom*
ATTORNEY

June 28, 1960  R. H. RILEY, JR., ET AL  2,942,490
TWO-SPEED TRANSMISSION FOR PORTABLE POWER-OPERATED TOOL
Filed Sept. 17, 1959  5 Sheets-Sheet 2

INVENTORS
ROBERT H. RILEY, JR.
HAROLD O. SHORT
BY
ATTORNEY

June 28, 1960  R. H. RILEY, JR., ET AL  2,942,490
TWO-SPEED TRANSMISSION FOR PORTABLE POWER-OPERATED TOOL
Filed Sept. 17, 1959  5 Sheets-Sheet 5

INVENTORS
ROBERT H. RILEY, JR.
BY HAROLD O. SHORT

*Leonard Bloom*
ATTORNEY

United States Patent Office 2,942,490
Patented June 28, 1960

2,942,490

TWO-SPEED TRANSMISSION FOR PORTABLE POWER-OPERATED TOOL

Robert H. Riley, Jr., and Harold O. Short, Towson, Md., assignors to The Black and Decker Manufacturing Company, Towson, Md., a corporation of Maryland Filed Sept. 17, 1959, Ser. No. 840,685

1 Claim. (Cl. 74—370)

The present invention relates to a two-speed transmission for a portable power-operated tool, such as a heavy-duty electric drill, and more particularly, to such a transmission wherein the speed may be changed smoothly and easily, not only when the tool is at rest, but also during the operation of the tool without any danger of damage to the gears and other parts.

In the prior art, two-speed transmissions for portable power-operated tools have been designed which operate on a wide variety of principles, all of which have certain inherent defects. For example, in some portable electric drills, two output spindles are provided, each of which rotates at a certain speed; and the conventional drill chuck may be taken off of one spindle and placed onto the other spindle to change speeds. Not only is such a unit bulky and unnecessarily complicated, but obviously, it has the inherent defect of not being able to change speeds during operation of the tool. Changing speeds during operation of the tool may be desirable in a good many cases where the speed of the unit has become unsuitable for the relative hardness of the work.

In numerous other tools a gear may be physically displaced into or out of engagement with other gears in order to obtain a change in speed. For example, a chuck key may be inserted into the gear case to physically shift the gears. In such units, changing speed during operation of the tool would probably result in gear tooth failure due to a clash of mating gears as contact is made; consequently, such tools are not capable of changing speeds while in operation.

In still other tools, the speed may be changed electrically by varying the speed of the electric motor, thus making such tools capable of changing speeds while in operation; but the electric motors for such tools are relatively complicated and expensive, and in some cases external rheostats are necessary.

In the air tool field, the speed may be changed by "feathering the trigger" or in other words, by varying the position of the valve to allow more or less air into the motor; but such a speed change method depends on the skill of the individual operator, does not provide a distinct speed setting, and in any event would be applicable to a portable air tool and not to a portable electric tool.

Therefore, it is the object of the present invention to provide a two-speed transmission for a portable power-operated tool (either electric or air-powered) that is capable of changing speeds smoothly and easily either when the tool is at rest or during its operation without any danger to the gears and other parts.

It is another object of the present invention to provide a two-speed transmission for a portable power-operated tool that is rugged and reliable in use and is capable of being manufactured economically.

In accordance with the teachings of the present invention, a two-speed transmission for a portable power-operated tool is provided having an input shaft and an output shaft and further having a spindle journalled within a suitable housing. A pair of gears are rotatably mounted upon the spindle and are axially restrained thereon, each of the gears being of different size and each being free to rotate with respect to the spindle. Means are provided to couple both gears to the input shaft so that both gears are constantly being driven during the operation of the tool. A shiftable clutch element is slidably-mounted on the spindle intermediate the gears, and the clutch element has a splined or keyed connection with the spindle so that both the clutch element and the spindle rotate in unison, the clutch element being free to slide axially along the spindle during operation of the tool. A group of three external clutch teeth are formed on each face of the clutch element and project outwardly therefrom in an axial direction beyond the respective planes of the face of the clutch element, and a group of three corresponding external clutch teeth are formed on the inner face of each of the gears adjacent to the clutch element and project outwardly therefrom in an axial direction towards the corresponding clutch teeth of the clutch element. Each of the clutch teeth within each of the groups of clutch teeth are circumferentially spaced equally from each other, and each of these individual clutch teeth has a circumferential width which is approximately one-half of the adjacent circumferential distance to either of the other two clutch teeth so as to facilitate proper meshing of the corresponding clutch teeth. Manually-manipulatable shifting means are provided to shift the clutch element axially along the spindle between the gears to selectively engage the clutch teeth of either gear so as to selectively couple either gear to the spindle, this shifting means including an axially-shiftable bifurcated fork having a pair of legs mounted within an external annular recess formed on the clutch element; and means are also provided to couple the spindle to the output shaft. Hence the clutch element may be shifted during the operation of the tool to selectively couple either gear to the spindle so as to drive the output shaft at either of two desired speeds.

The present invention may be more fully understood by reference to the enclosed drawings, in which.

Figure 1:
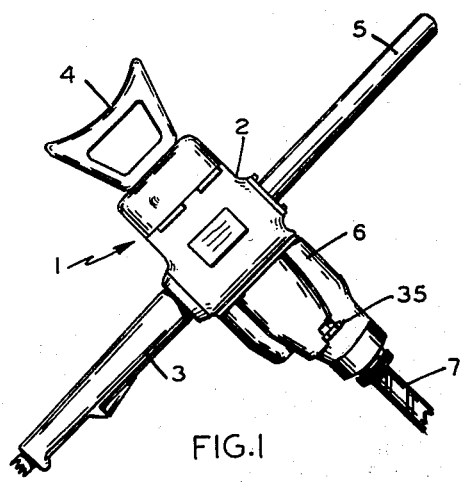
Figure 1 is a pictorial view of a heavy-duty portable electric drill having the two-speed transmission of the present invention secured thereto.

With reference to Figure 1, there is shown a heavy-duty portable electric drill 1 having motor 2, switch handle 3, handles 4 and 5, and drill bit 8, and further having the two-speed transmission 6 and its manually-manipulated external shift lever finger 35 included therewith. It should be noted that the illustration of a heavy-duty portable electric drill is merely for the sake of convenience and that the essence of the present invention is equally applicable to a wide variety of portable power-operated tools, both of the air and electric-powered type.

Figure 2:
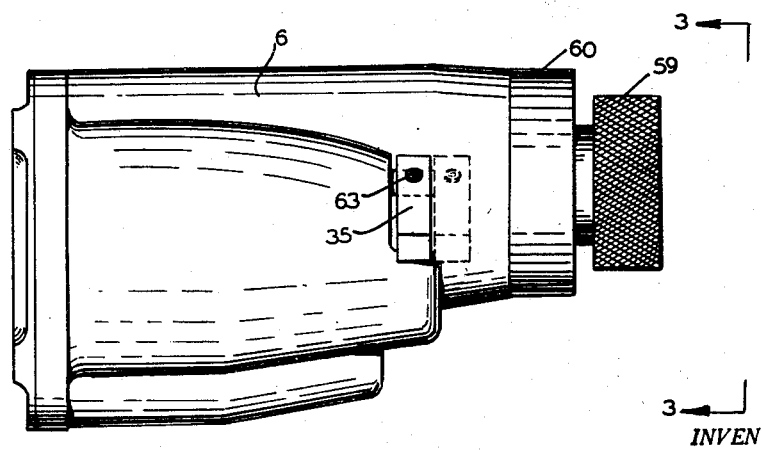
Figure 2 is an enlarged pictorial view of the two-speed transmission shown in Figure 1.

With reference to Figure 2, the shift lever finger 35 is also shown in dotted form to indicate the alternate position to which it may be shifted.

Figure 5:
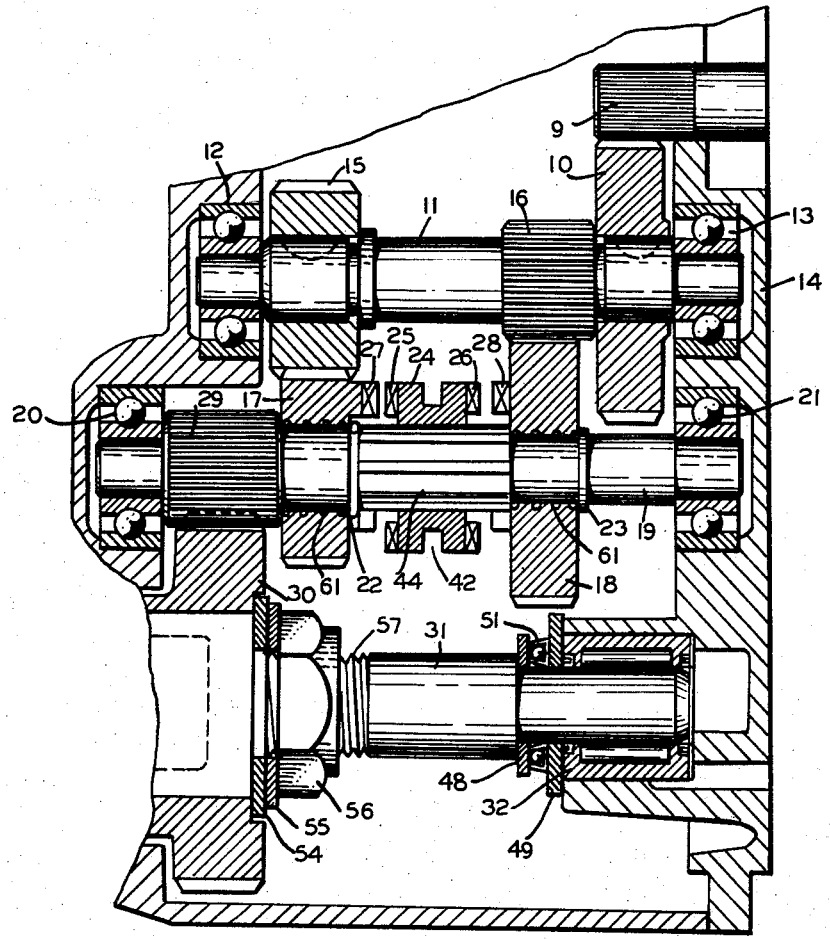
Figure 5 is an exploded view of the complete two-speed transmission taken along line 5—5 of Figure 3 and spread-out in a single plane.

With reference to the exploded and spread-out view of Figure 5, the present invention may perhaps be most clearly understood. As shown in Figure 5, armature pinion 9 meshes with a gear 10 secured to input shaft 11, the latter being journalled in suitable ball bearings 12 and 13 within the housing 14. Shaft 11 carries gear 15 and pinion gear 16 secured thereon, which in turn mesh with gears 17 and 18, respectively. Gears 17 and 18 are rotatably mounted on spindle 19, which is journalled in ball bearings 20 and 21 within housing 14. Gears 17 and 18 are each free to rotate upon spindle 19, but are each axially restrained thereon by means of washers 22 and 23, respectively. Oil grooves 61 provide sufficient lubrication for gears 17 and 18. Moreover, gears 17 and 18 are of different size (1:2 as illustrated, although any size ratio and hence speed ratio may be selected), and both gears 17 and 18 are constantly being driven during the operation of the tool. Mounted upon spindle 19 intermediate gears 17 and 18 is a clutch element 24, having a splined, keyed, or other suitable connection with spindle 19. Thus clutch element 24 and spindle 19 rotate in unison, but clutch element 24 may be axially shifted along spindle 19 during operation of the tool.

External clutch teeth 25 and 26 are provided on each face of clutch element 24, and likewise, corresponding external clutch teeth 27 and 28 are provided on the inner or adjacent faces of gears 17 and 18, respectively. As shown more particularly in Figure 7, each of the four groups of clutch teeth (herein identified as respective groups by means of the numerals 25, 26, 17, and 28) are each comprised of a plurality of three external clutch teeth (identified in Figure 7 by the numeral 26); and each of the individual clutch teeth within each of the groups of clutch teeth, as at 26, are circumferentially spaced equally from each other. Moreover, each of the individual clutch teeth has a circumferential width which is approximately one-half of the adjacent circumferential distance to either of the other two clutch teeth, thus facilitating an easy coupling or meshing between the corresponding groups of external clutch teeth formed on the clutch element 24 and the face of the respective gears 17 and 18. Thus, as clutch element 24 is axially shifted along spindle 19 between gears 17 and 18, either clutch teeth 25 and 27 will engage to couple gear 17 to spindle 19 or else clutch teeth 26 and 28 will engage to couple gear 18 to spindle 19. In Figure 5 (and Figure 6 as well) clutch element 24 is shown in the midpoint or neutral position between gears 17 and 18 for clarity of illustration, it being understood that in operation clutch element 24 will mesh with either gear 17 or gear 18 for two distinct and different speeds of operation. Spindle 19 carries a pinion 29 which meshes with gear 30 carried by output shaft 31, which is suitably journalled within the rear of housing 14 by means of roller bearing 32; and the method of journalling output shaft 31 within the forward portion of housing 14 and of securing gear 30 to output shaft 31 will be explained hereinafter.

It is seen that whenever clutch 24 is axially shifted along spindle 19 to either engage gear 17 or 18, that the input shaft 11 rotating at a constant speed is then coupled to spindle 19 through either gear 17 or 18 to rotate spindle 19 at either of two distinct speeds; and thus pinion 29 will drive gear 30 and hence output shaft 31 at either of two distinct speeds. All of the gears and pinions are always in mesh, and the speed is changed not by physically shifting a gear, but rather, by shifting a clutch element 24 to selectively couple either of two gear trains together. There is no problem of gear teeth clashing together and giving rise to failures inasmuch as the corresponding clutch teeth 25 and 27, or 26 and 28, will immediately mesh together even in operation with no clashing problems whatsoever.

Figure 6:
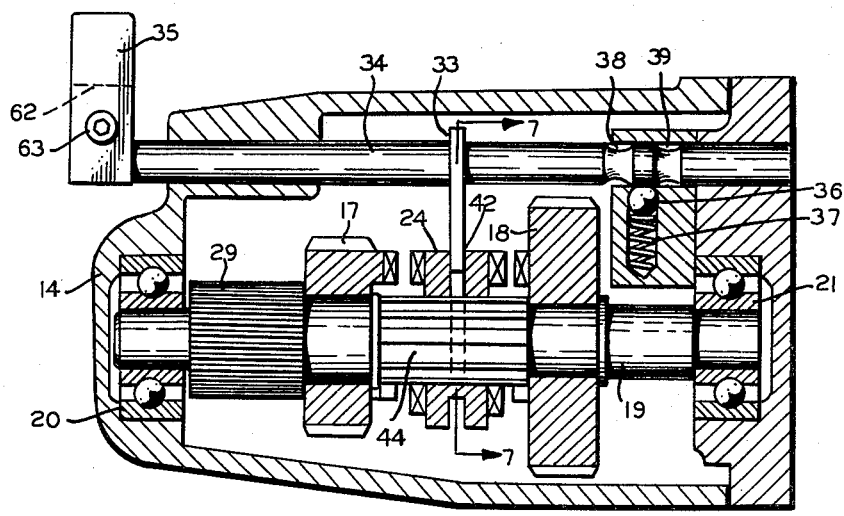
Figure 6 is a view taken along lines 6—6 of Figure 3, showing the assembly of the clutch, bifurcated fork, shift lever rod, and shift lever finger.
Figure 7:
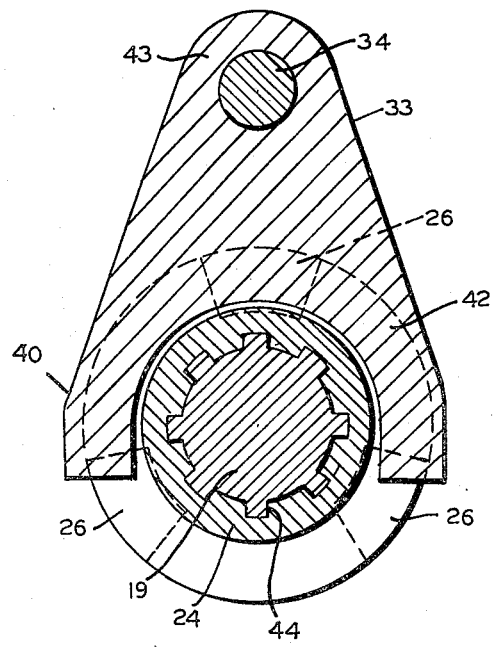
Figure 7 is a view taken along lines 7—7 of Figure 6.

The means for manually-manipulating clutch 24 is shown most clearly in Figures 6 and 7. The shift lever rod 34 is journalled within housing 14 and has an external manually-manipulatable shift lever finger 35 secured to its protruding portion by means of slot 62 and screw 63, as shown more clearly in Figure 3. A ball 36 under the tension of spring 37 is positioned within the housing 14 to engage detents 38 and 39 formed on rod 34, so that rod 34 may be shifted to two distinct positions. (In Figure 6, rod 34 is shown in a "neutral" position for sake of convenience.) Securely mounted upon rod 34 is a bifurcated fork 33, the sectional plan view of which is shown in Figure 7. Fork 33 has legs 40 and 41 which loosely fit within an external annular recess 42 formed on clutch 24 (see Figure 5), and the apex 43 of fork 33 has rod 34 secured thereto by brazing or other suitable methods. Clutch 24 may rotate free of interference from fork 33; and when rod 34 is actuated and shifted to its other position, legs 40 and 41 of fork 33 will grab clutch 24 and shift it axially along spindle 19.

Clutch element 24 has three external clutch teeth 25, 26 formed on each face thereof (as shown in Figures 4, 5, 6, and 7) so as to correspond with the three complementary external clutch teeth 27 and 28 formed on the inner adjacent faces of gears 17 and 18, respectively; and clutch element 24 is suitably connected to spindle 19 by a spline 44 as shown most clearly in Figure 7. Thus clutch element 24 may be axially shifted along spindle 19 to selectively couple either gear 17 or gear 18 to spindle 19 under full operating load conditions easily and in a positive and direct movement without any clashing of gear teeth and without the necessity for synchronizing either gear 17 or gear 18 with respect to clutch element 24.

Figure 3:
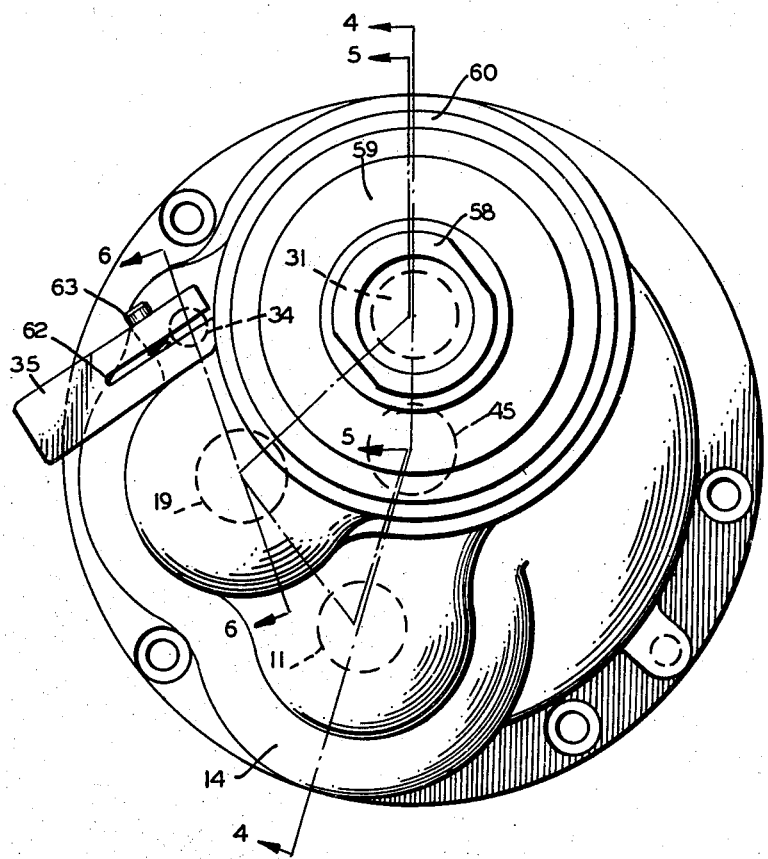
Figure 3 is a view taken along line 3—3 of Figure 2 showing the end view of the transmission and further showing the spindle and various shafts in dotted form.
Figure 4:
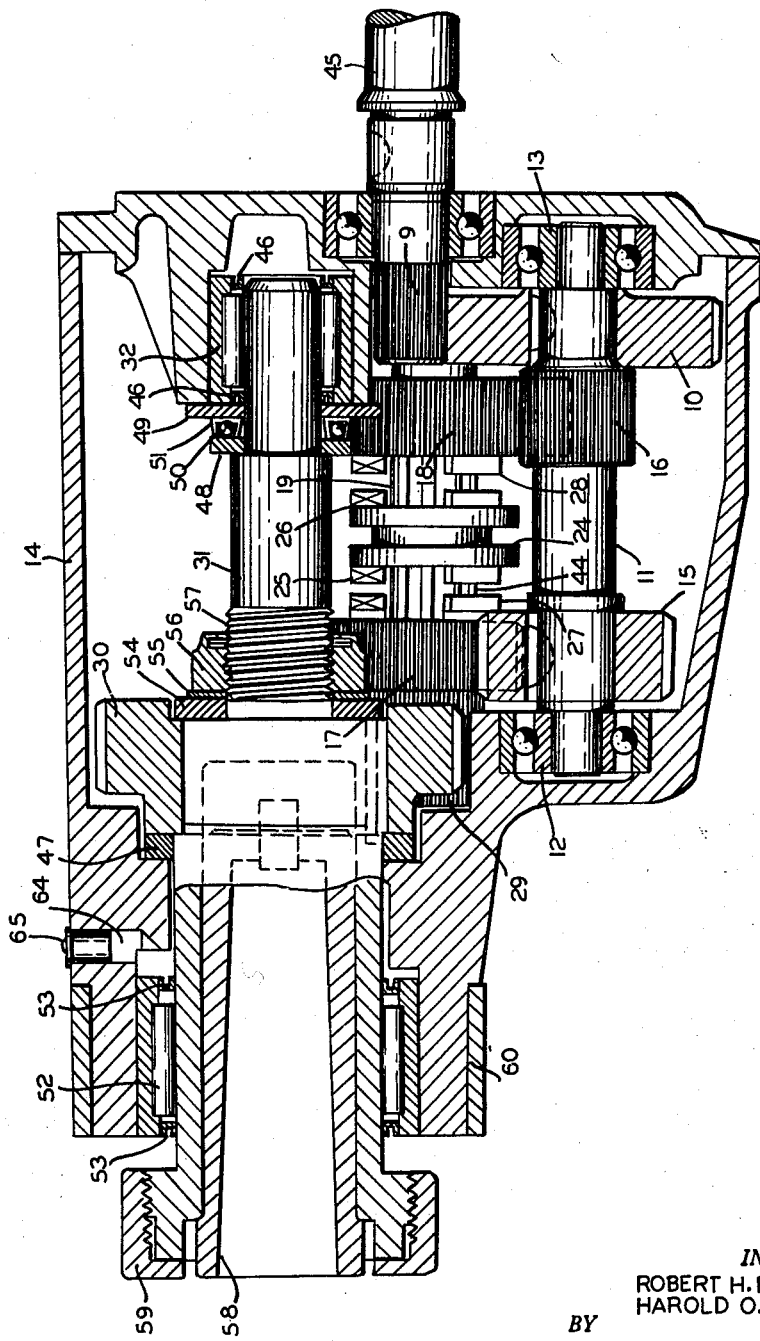
Figure 4 is a view taken along line 4—4 of Figure 3.

With reference to Fig. 4, there is shown a view of the two-speed transmission of the present invention in which shaft 11 carrying gear 15 and pinion gear 16, and shaft 31 carrying gear 30, are illustrated in sectional view along line 4—4' of Figure 3; and spindle 19, gears 17 and 18, clutch element 24, teeth 25, 26, 27 and 28, and spline 4 are partially illustrated in pictorial form as recessed behind the sectioning line 4—4' of Figure 3. Armature shaft 45 carries armature pinion 9 which meshes with gear 10 carried by shaft 11. As previously explained, shaft 11 carries gears 15 and 16, which mesh respectively, with gears 17 and 18 mounted for free rotation upon spindle 19; and gears 17 and 18 are alternately and selectively coupled to spindle 19 by means of clutch element 24 and spline 44. Spindle 19 carries pinion 29 (mostly obscured in Figure 4, but shown clearly in Figures 5 and 6) which meshes with gear 30 on output shaft 31. The rear portion of output shaft 31 is journalled within housing 14 by means of roller bearing 32, which is provided with grease seals 46. Output shaft 31 is axially retained within housing 14 by means of front thrust washer 47 and by means of rear ball thrust washers 48 and 49 having thrust balls 50 and thrust ball retainer 51 therebetween. The front portion of output shaft 31 is journalled within housing 14 by means of roller bearing 52, which is provided with grease seals 53, the lubrication of roller bearing 52 being supplied through radial hole 64 and oil cup 65. Gear 30 is secured to output shaft 31 by means of gear washer 54, cone lock washer 55, and elastic stop nut 56, the latter being secured to the threaded portion 57 of output shaft 31. A conventional "Morse-tapered" spindle sleeve 58 is shown together with spindle nut 59 for holding a suitable drill bit (not shown), and a stiffening ferrule 60 is provided for greater rigidity at the output end of housing 14. It should be noted, however, that tapered spindle sleeve 58 is illustrated merely for the sake of convenience, and that other suitable spindles and chucks may be used.

Obviously, many modifications and minor variations may be made without departing from the basic spirit of the invention; therefore, it is to be understood that with-

We claim:

In a two-speed transmission for a power-operated tool in which a pair of constantly-driven gears of different size are each rotatably mounted upon a spindle and an axially-shiftable clutch element is slidably mounted upon said spindle and operatively coupled thereto intermediate said gears: that improvement in being able at desired times to axially shift said clutch element easily under full operating load conditions to selectively couple either of said gears to said spindle, comprising, a group of three external clutch teeth formed on each face of said clutch element and projecting outwardly therefrom in an axial direction beyond the respective planes of said faces of said clutch element, a group of three corresponding external clutch teeth formed on the inner face of each of said gears adjacent said clutch element and projecting outwardly therefrom in an axial direction towards said corresponding clutch teeth of said clutch element, each of said clutch teeth within each of said groups of clutch teeth being circumferentially spaced equally from each other, and each of said clutch teeth having a circumferential width which is approximately one-half of the adjacent circumferential distance to either of the other two clutch teeth, the engagement of said corresponding clutch teeth being in a plane or planes transverse to the axis of said spindle, and shifting means to manually shift said clutch element axially along said spindle in either direction, said shifting means including an axially-shiftable bifurcated fork having a pair of legs mounted within an external annular recess formed on said clutch element, whereby either of said gears may be selectively coupled to said spindle under full operating load conditions easily and in a positive and direct movement without any clashing of gear teeth and without the necessity for synchronizing either of said gears with respect to said clutch element.

References Cited in the file of this patent

UNITED STATES PATENTS

| | | |
|---|---|---|
| 1,864,549 | Paul | June 28, 1932 |
| 2,669,880 | Brock et al. | Feb. 23, 1954 |
| 2,676,494 | Olson | Apr. 27, 1954 |
| 2,711,222 | Bock | June 21, 1955 |
| 2,727,602 | Saives | Dec. 20, 1955 |
| 2,774,249 | Moline | Dec. 18, 1956 |
| 2,893,256 | Wargo | July 7, 1959 |